US012644525B2

(12) United States Patent
Sun et al.

(10) Patent No.: US 12,644,525 B2
(45) Date of Patent: Jun. 2, 2026

(54) CONTROL VALVE APPLICABLE TO VEHICLE WATER PUMP

(71) Applicant: Zhejiang Hongchen auto Parts Manufacturing Co., LTD, Wenzhou (CN)

(72) Inventors: Dongliang Sun, Ruian (CN); Yong Dai, Ruian (CN); Jiben Peng, Wenzhou (CN); Li Zhang, Ruian (CN); Xianghe Chen, Ruian (CN)

( * ) Notice: Subject to any disclaimer, the term of this patent is extended or adjusted under 35 U.S.C. 154(b) by 0 days.

(21) Appl. No.: 18/979,142

(22) Filed: Dec. 12, 2024

(65) Prior Publication Data

US 2026/0043485 A1 Feb. 12, 2026

(30) Foreign Application Priority Data

Aug. 12, 2024 (CN) .......................... 202411099404.0

(51) Int. Cl.
F16K 11/07 (2006.01)
F01P 7/14 (2006.01)
F16K 31/54 (2006.01)

(52) U.S. Cl.
CPC .......... F16K 11/0716 (2013.01); F16K 31/54 (2013.01); *F01P 2007/146* (2013.01); *Y10T 137/86879* (2015.04)

(58) Field of Classification Search
CPC . F16K 3/26; F16K 3/262; F16K 3/265; F16K 11/07; F16K 11/0716; F16K 31/53; F16K 31/54; F01P 5/10; F01P 7/14; F01P 2007/146; Y10T 137/86702; Y10T 137/86879

USPC ........ 251/250, 343, 344; 137/625.48, 625.68
See application file for complete search history.

(56) References Cited

U.S. PATENT DOCUMENTS

| | | | | |
|---|---|---|---|---|
| 2,931,615 A | * | 4/1960 | Campbell | F16K 3/26 |
| | | | | 251/282 |
| 2,995,337 A | * | 8/1961 | Tanner | F16K 31/54 |
| | | | | 251/324 |
| 4,190,081 A | * | 2/1980 | Coles | F16K 11/07 |
| | | | | 137/625.65 |
| 4,232,801 A | * | 11/1980 | Chronis | A47J 47/01 |
| | | | | 222/409 |

(Continued)

FOREIGN PATENT DOCUMENTS

| | | |
|---|---|---|
| CN | 105196859 A | 12/2015 |
| CN | 110905829 A | 3/2020 |
| CN | 215521231 U | 1/2022 |

*Primary Examiner* — Kenneth Rinehart
*Assistant Examiner* — Jonathan J. Waddy
(74) *Attorney, Agent, or Firm* — Nitin Kaushik

(57) ABSTRACT

The present invention relates to the technical field of vehicle water pumps, and in particular, to a control valve applicable to a vehicle water pump. The control valve includes a valve body and a valve core movably disposed in the valve body. A valve allowing a coolant to pass through the valve body is disposed on an outer circumferential surface of the valve body, a swing arm driving the valve core to perform reciprocating movement along a vertical direction to control opening and closing of the valve is disposed at an upper end of the valve body, and a transmission structure transmitting torque is disposed between the swing arm and the valve core. Beneficial effects of the present invention are as follows: assembly difficulty is reduced, assembly efficiency is improved, and a service life is prolonged.

5 Claims, 11 Drawing Sheets

(56) References Cited

U.S. PATENT DOCUMENTS

| | | | | |
|---|---|---|---|---|
| 5,887,621 | A * | 3/1999 | Doll .......................... | F16K 3/26 |
| | | | | 137/625.38 |
| 6,955,187 | B1 * | 10/2005 | Johnson ................ | F16K 31/025 |
| | | | | 429/444 |
| 9,494,246 | B1 * | 11/2016 | Potter ................... | F16K 27/048 |
| 2008/0035225 | A1 * | 2/2008 | Tackes ................ | F16K 11/0716 |
| | | | | 137/625.35 |
| 2008/0224075 | A1 * | 9/2008 | Emin ...................... | F16K 3/265 |
| | | | | 251/120 |
| 2010/0051840 | A1 * | 3/2010 | Jung ....................... | F16K 3/265 |
| | | | | 251/129.03 |
| 2016/0290698 | A1 * | 10/2016 | Dodson .............. | F16K 11/0712 |
| 2017/0328311 | A1 * | 11/2017 | Franklin .......... | F16K 31/52408 |

* cited by examiner

CONTROL VALVE APPLICABLE TO VEHICLE WATER PUMP

CROSS-REFERENCE TO RELATED APPLICATIONS

The application claims priority to Chinese patent application No. 202411099404.0, filed on Aug. 12, 2024, the entire contents of which are incorporated herein by reference.

TECHNICAL FIELD

The present invention relates to the technical field of vehicle water pumps, and in particular, to a control valve applicable to a vehicle water pump.

BACKGROUND

A vehicle water pump is an important component configured to cool a vehicle engine. An invention patent with application No. CN202320985535.3 discloses an integrated mechanical water pump, including a water pump housing, where a valve body housing (2) is disposed on one side of an inner wall of the water pump housing, the valve body (2) and the water pump housing (1) are of an integrally formed mechanism, a rotor (3) is disposed on a top portion of the water pump housing (1), the rotor (3) is connected to a transmission shaft, one end of the transmission shaft penetrates through the water pump housing (1) and is connected to an impeller (4), a valve swing arm (6) is mounted on the water pump housing (1), and the valve swing arm (6) is connected to a valve core (5) through a shaft body.

The integrated mechanical water pump has the following defects during actual production and use: 1. The valve core rotates in the valve body housing to control input and output of a coolant. With reference to FIG. 1, after the valve core is used for a long time, two side edges of the valve core cannot be tightly matched with the valve body housing, and sealing of the valve core is reduced, thereby resulting in invalidation of the mechanical water pump. 2. Since the valve swing arm is connected to the valve core through the shaft body, during actual assembly, a tool needs to be used to press the valve swing arm into the shaft body, to form interference fitting between the valve swing arm and the shaft body. If pressing is insufficient, the shaft body cannot be driven by driving the valve swing arm. The assembly precision is high, and the assembly steps are complicated. After long use, looseness may occur between the valve swing arm and the shaft body, thereby resulting in invalidation of the mechanical water pump.

SUMMARY

A technical problem to be solved by the present invention is to provide a control valve applicable to a vehicle water pump for the above deficiencies in the prior art, thereby reducing assembly difficulty, improving assembly efficiency, and prolonging a service life.

To implement the above purpose, the present invention provides the following technical solutions: a control valve applicable to a vehicle water pump, including a valve body and a valve core movably disposed in the valve body, where the valve body includes a valve body portion that is of a cylindrical shape and a connecting portion disposed on an end portion of the valve body portion, the valve core includes a valve core portion sleeved with the valve body and a rack portion penetrating through the connecting portion, an outer circumferential surface of the valve body is provided with at least one first water inlet window and at least one first water outlet window, an outer circumferential surface of the valve core is provided with at least one second water inlet window adapted to the first water inlet window and at least one second water outlet window adapted to the first water outlet window, when the second water inlet window overlaps with the first water inlet window, and the first water outlet window overlaps with the second water outlet window, a valve is opened, when the first water inlet window overlaps with the outer circumferential surface of the valve core, the valve is closed, a swing arm driving the valve core to perform reciprocating movement along a vertical direction to control opening and closing of the valve is disposed on the valve body, a gear shaft engaged with the rack portion is disposed on the swing arm, the rack portion is disposed along the vertical direction, and the gear shaft is disposed along a horizontal direction.

According to the present invention with the above features, the swing arm drives the valve core to perform reciprocating movement along the vertical direction to control opening and closing of the valve. Compared to a rotary valve core, this design is simpler and more intuitive and reduces complexity of rotary sealing. A manner of engagement between the rack and the gear is used as the connecting structure between the valve core and the swing arm, so that the rack portion only needs to be engaged with the swing arm in place during assembly without interference fitting, thereby reducing assembly difficulty and precision requirements, improving assembly efficiency, facilitating disassembly and assembly, and helping subsequent maintenance. Since the valve core moves vertically but not rotatably, a friction area and a wear point between the valve core and the valve body are reduced, thereby helping improve an overall sealing effect and prolong a service life.

Further, according to the present invention, an outer circumferential surface of the valve body portion is provided with a plurality of first water inlet windows arranged along the vertical direction sequentially, a first blocking portion is formed between two first water inlet windows arranged up and down, an outer circumferential surface of the valve core portion is provided with a plurality of second water inlet windows arranged along the vertical direction sequentially, a second blocking portion is formed between two second water inlet windows arranged up and down, a cross-sectional area of the first water inlet window is the same as a cross-sectional area of the second blocking portion, and a cross-sectional area of the second water inlet window is the same as a cross-sectional area of the first blocking portion.

According to the present invention with the above features, a plurality of first water inlet windows and second water inlet windows are disposed, so that a coolant flow may be accurately adjusted according to a real-time requirement of an engine, to improve cooling efficiency. Compared with a single design of a large window, a design of a plurality of small windows reduces a risk of stress concentration and prolongs a service life of the water pump. The outer circumferential surface of the valve core is tightly attached with an inner wall of the valve body, to form a good sealing surface. When a coolant passing channel is closed, the first water inlet window is completely blocked by the valve core, thereby further enhancing a sealing effect and ensuring sealing performance of the water pump.

Further, according to the present invention, a first reinforcing rib is disposed in the first water inlet window along the vertical direction, the first reinforcing rib is located on a middle portion of the first water inlet window and divides the first water inlet window into two parts, a second reinforcing rib is disposed in the second water inlet window along the vertical direction, the second reinforcing rib is located on a middle portion of the second water inlet window and divides the second water inlet window into two parts, and an outer circumferential surface of the second reinforcing rib is attached with an inner wall of the first reinforcing rib.

According to the present invention with the above features, the first reinforcing rib and the second reinforcing rib are located on middle portions of respective water inlet windows respectively and divide the windows into two parts. This design significantly enhances structural strength of a water inlet window region. When a coolant flows, especially when the flow is large or pressure is high, the reinforcing rib can effectively resist stress caused by an impact of a water stream, to prevent deformation or rupture of the window.

Further, according to the present invention, an outer circumferential surface of the first blocking portion includes a first water inlet surface inclining toward a lower end of the valve body, a second water inlet surface inclining toward an upper end of the valve body, and a connecting surface connecting the first water inlet surface and the second water inlet surface, and the connecting surface is the outer circumferential surface of the valve body portion.

According to the present invention with the above features, an outer circumferential surface, in contact with the coolant, of the first blocking portion is provided with an inclined surface, to reduce resistance force generated when the coolant passes, so that the coolant can pass through the valve body more smoothly, thereby improving overall efficiency of the water pump.

Further, according to the present invention, a swing arm base is detachably connected to the connecting portion of the valve body, the swing arm base includes a bottom plate and two placing blocks disposed on the bottom plate, the bottom plate is provided with a rack through hole allowing the rack portion to penetrate through, the two placing blocks are disposed on two sides of the rack through hole, the gear shaft is mounted on the two placing blocks, a gear of the gear shaft is suspended on the rack through hole and is engaged with the rack portion, a swing arm main body is disposed vertically with the gear shaft, the swing arm main body is located on an outer side of one of the placing blocks, and a limiting block limiting a swinging angle of the swing arm main body is disposed on an outer circumferential surface of the placing block.

According to the present invention with the above features, the placing blocks are disposed for erecting the swing arm, and the gear shaft is mounted on the swing arm base horizontally, so that the gear shaft can be engaged with the rack portion disposed vertically. The swing arm base is detachably connected to the swing arm cover to facilitate mounting of the swing arm. A swinging amplitude of the swing arm main body is limited to limit a lifting height of the valve core, to prevent the valve core from being lifted excessively to cause that the valve core cannot be matched with the valve to result in invalidation of the valve.

Further, according to the present invention, a swing arm cover is detachably connected to the swing arm base, the swing arm cover includes a cover body and two splicing blocks disposed on the cover body, the cover body is detachably connected to the placing block through a fastener, the splicing block is located at an interval between the two placing blocks and is spliced with the placing block, a confined space allowing the gear shaft and the rack portion to move is formed between the swing arm cover and the swing arm base, the placing block is provided with a first circular arc groove allowing the gear shaft to be placed, the cover body is provided with a second circular arc groove corresponding to the first circular arc groove, and the first circular arc groove is matched with the second circular arc groove to clamp the gear shaft.

According to the present invention with the above features, the swing arm base is spliced with the swing arm cover, and the confined space allowing the gear shaft and the rack portion to move is formed between the swing arm base and the swing arm cover, so that impurities can be prevented from entering to affect service lives of the gear shaft and the rack portion. The placing block is provided with the first circular arc groove allowing the gear shaft to be placed, the cover body is provided with the second circular arc groove correspondingly, and the first circular arc groove is matched with the second circular arc groove to clamp the gear shaft. This design not only provides stable support for the gear shaft, but also ensures coaxiality and stability of the gear shaft during rotation through an accurate circular arc design, thereby improving transmission precision and reliability.

The following describes the present invention in detail with reference to the accompanying drawings and embodiments.

DETAILED DESCRIPTION OF THE EMBODIMENTS

Figure 1:
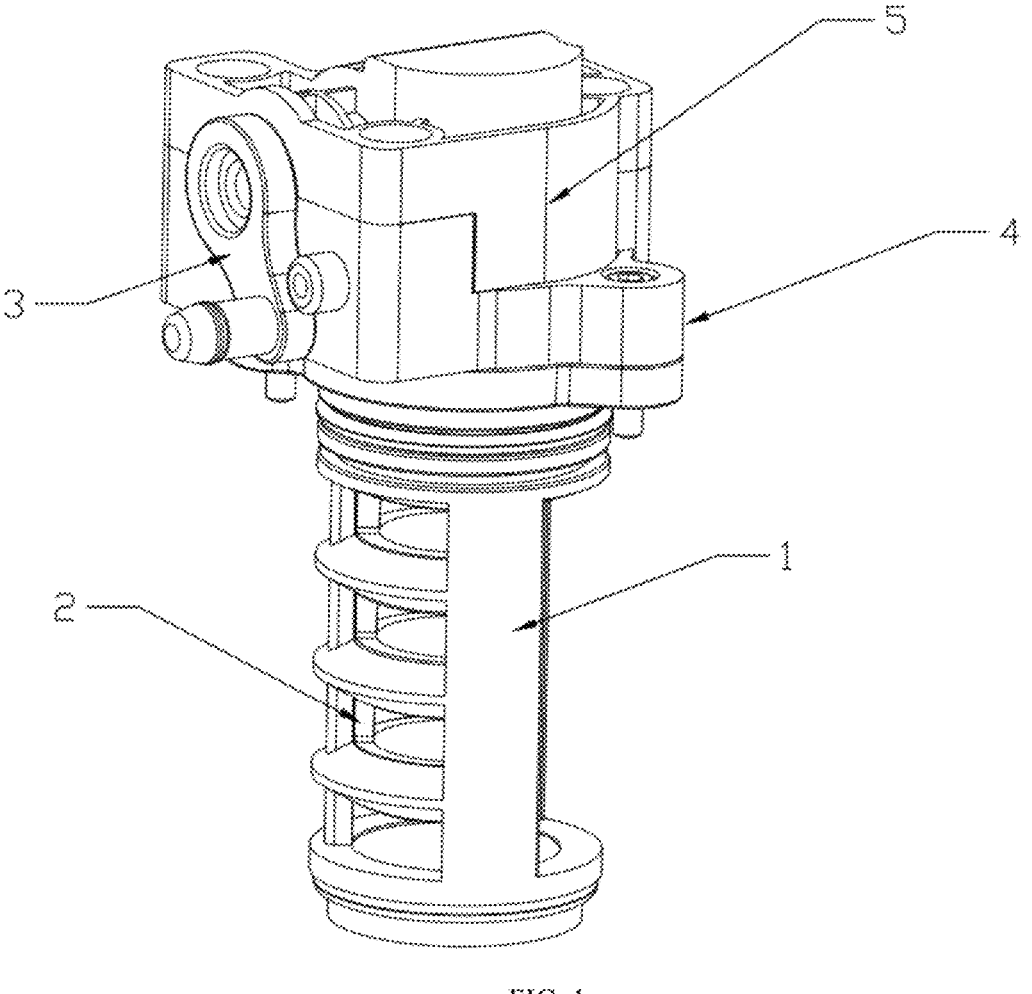
FIG. 1 is a schematic structural diagram of a valve in an open state according to an embodiment of the present invention.
Figure 2:
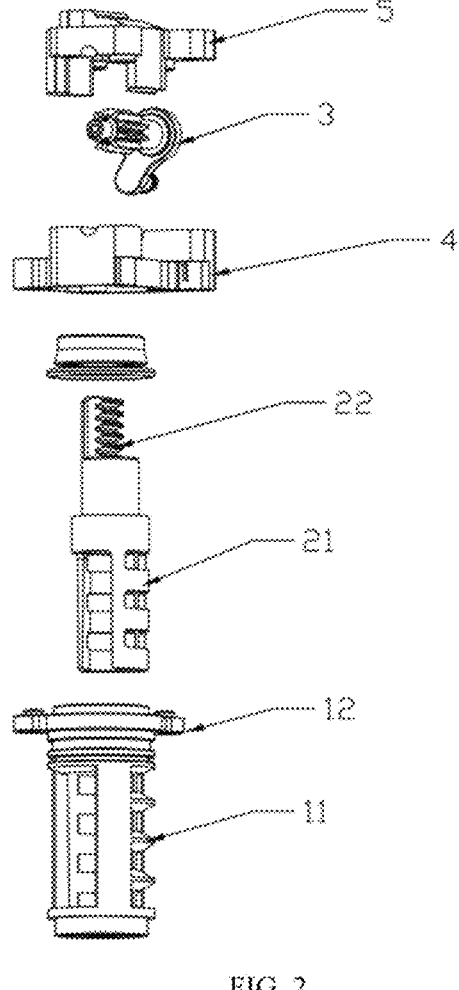
FIG. 2 is an exploded view according to an embodiment of the present invention.
Figure 3:
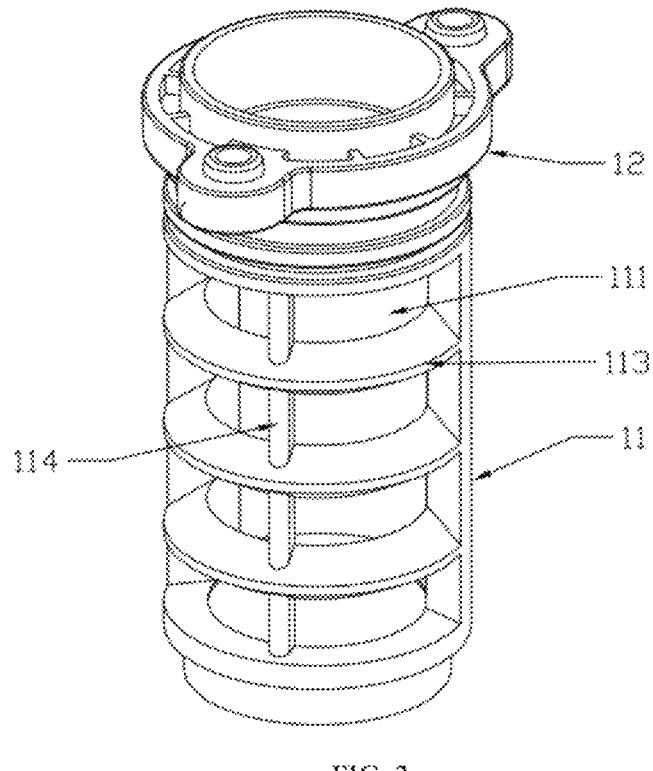
FIG. 3 is a schematic structural diagram 1 of a valve body according to an embodiment of the present invention.
Figure 4:
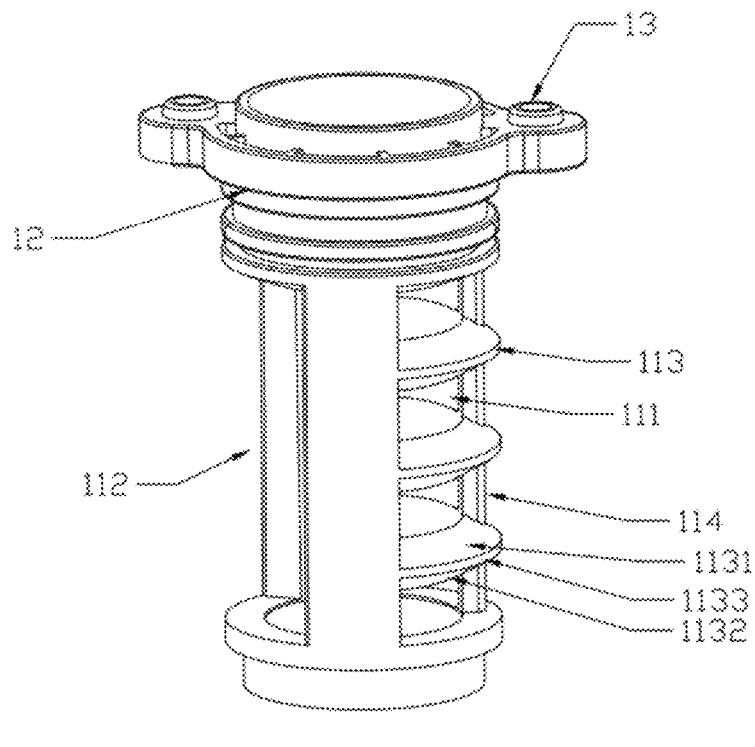
FIG. 4 is a schematic structural diagram 2 of a valve body according to an embodiment of the present invention.
Figure 5:
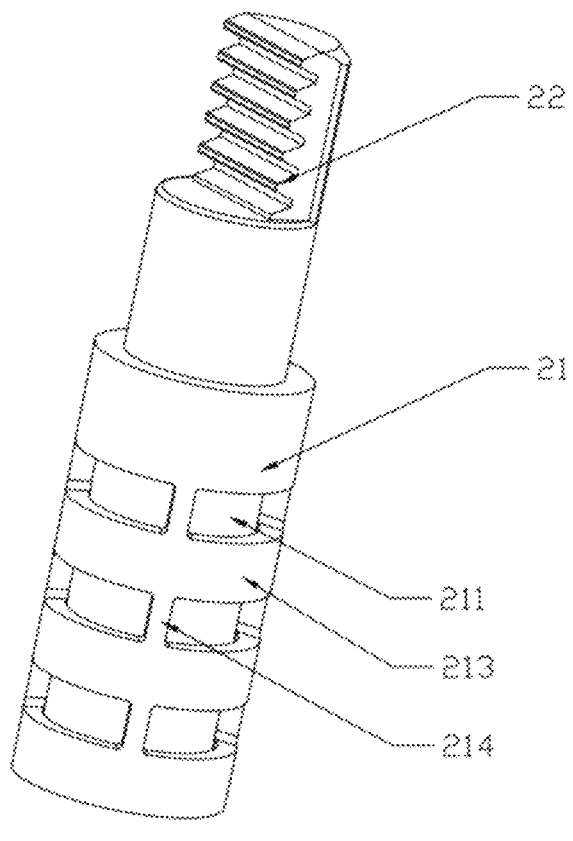
FIG. 5 is a schematic structural diagram 1 of a valve core according to an embodiment of the present invention.
Figure 6:
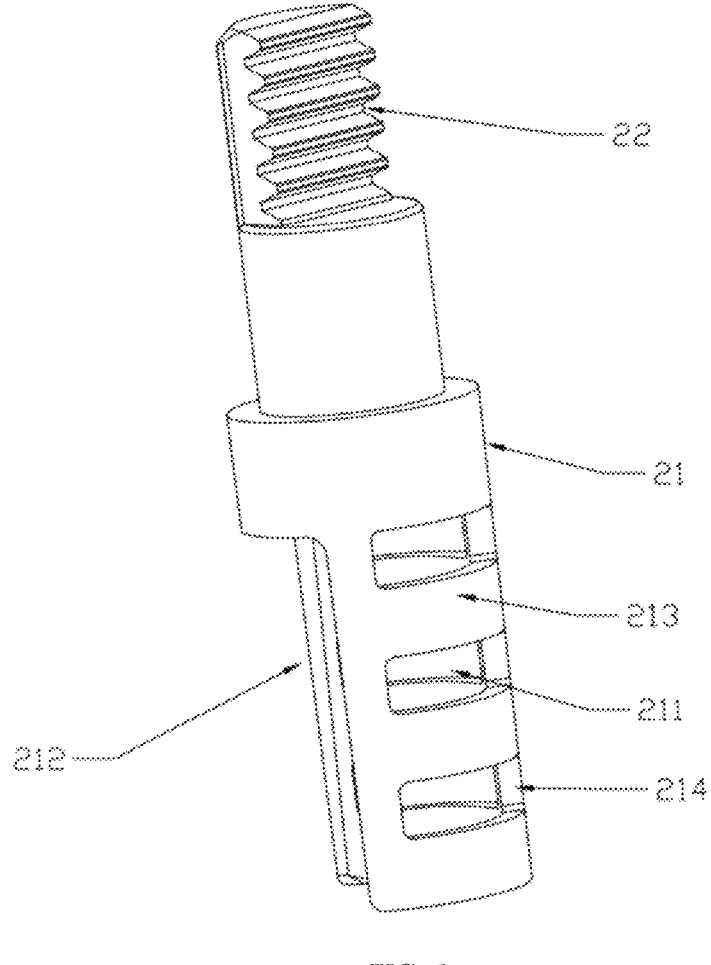
FIG. 6 is a schematic structural diagram 2 of a valve core according to an embodiment of the present invention.
Figure 7:
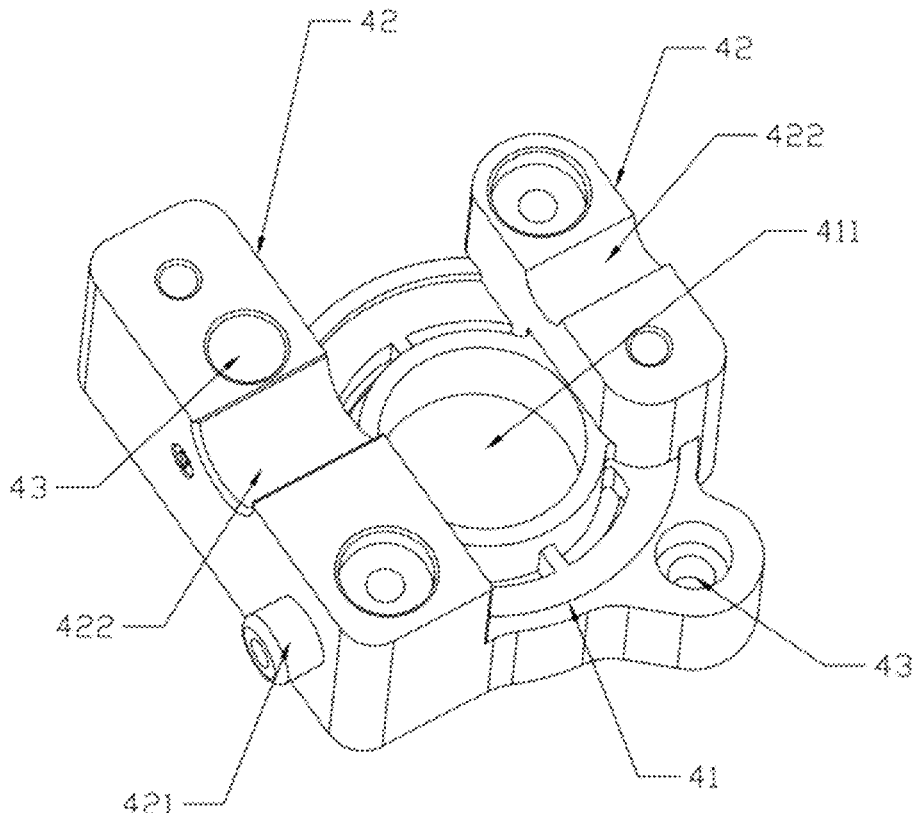
FIG. 7 is a schematic structural diagram of a swing arm base according to an embodiment of the present invention.
Figure 8:
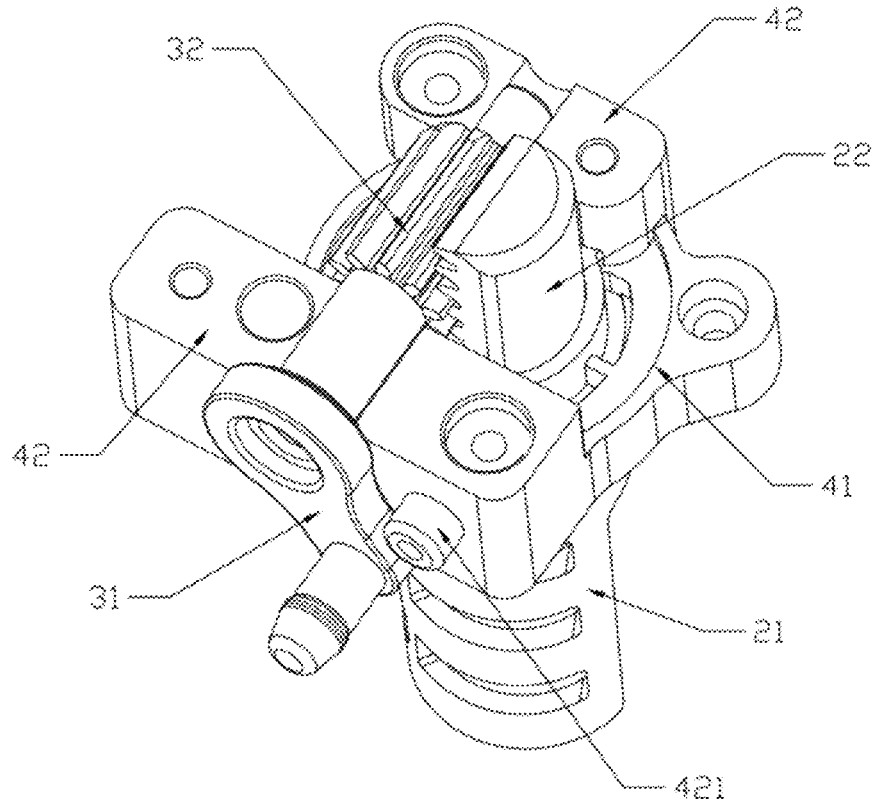
FIG. 8 is a schematic structural diagram of a swing arm, swing arm base, and a valve core according to an embodiment of the present invention.
Figure 9:
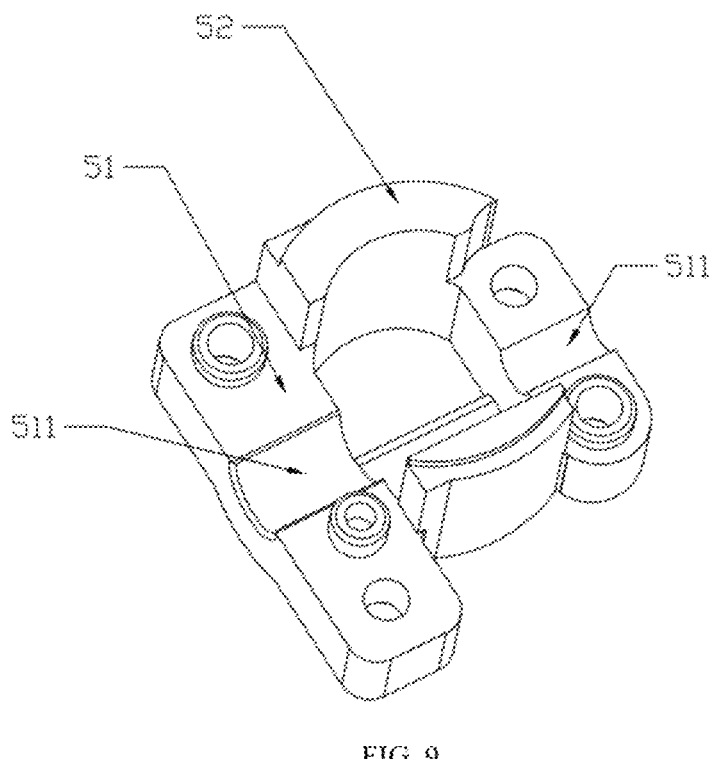
FIG. 9 is a schematic structural diagram of a swing arm cover according to an embodiment of the present invention.

The specific embodiments are merely to explain the present invention rather than to limit the present invention. After reading the specification, a person skilled in the art may make modifications as required without inventive contribution to the embodiments, but they are protected by the patent law as long as they are within the scope of the claims of the present invention.

As shown in FIG. 1 to FIG. 11, a control valve applicable to a vehicle water pump includes a valve body 1 and a valve core 2 movably disposed in the valve body 1. A valve allowing a coolant to pass through the valve body 1 is disposed on an outer circumferential surface of the valve body 1, and a swing arm 3 driving the valve core 2 to perform reciprocating movement along a vertical direction to control opening and closing of the valve is disposed at an upper end of the valve body 1. A transmission structure transmitting torque is disposed between the swing arm 3 and the valve core 2, a swing arm base 4 is detachably connected to the valve body 1, and a swing arm cover 5 is detachably connected to the swing arm base 4.

The valve core 2 includes a valve core portion 21 and a rack portion 22 that are matched with the valve body 1, the swing arm 3 includes a swing arm main body 31 and a gear shaft 32, and the transmission structure is the rack portion 22 and the gear shaft 32 that are engaged with other. The rack portion 22 is disposed along the vertical direction, and the gear shaft 32 is disposed along a horizontal direction.

The valve core 2 and the valve body 1 are sleeved and are internally hollow, and the valve body 1 includes a valve body portion 11 that is of a cylindrical shape and a connecting portion 12 disposed on an end portion of the valve body portion 11. The valve core portion 21 of the valve core 2 is of a cylindrical shape, an outer circumferential surface of the valve core portion is attached with an inner wall of the valve body portion 11, and an outer circumferential surface of the valve body portion 11 is provided with at least one first water inlet window 111 and at least one first water outlet window 112, to implement a basic function of the valve. In the embodiment, the outer circumferential surface of the valve body portion 11 is provided with a plurality of first water inlet windows 111 arranged along the vertical direction sequentially, and a first blocking portion 113 is formed between two first water inlet windows 111 arranged up and down. The outer circumferential surface of the valve body portion 11 is provided with one first water outlet window 112, an upper side edge of the first water outlet window 112 is at the same height as an upper side edge of a 1st first water inlet window 111, a lower side edge of the first water outlet window 112 is at the same height as a lower side edge of a last first water inlet window 111, and the first water inlet window 111 and the first water outlet window 112 form the valve. The outer circumferential surface of the valve core portion 21 is provided with at least one second water inlet window 211 adapted to the first water inlet window 111 and at least one second water outlet window 212 adapted to the first water outlet window 112, to implement the basic function of the valve. In the embodiment, the outer circumferential surface of the valve core portion 21 is provided with a plurality of second water inlet windows 211 arranged along the vertical direction sequentially, and a second blocking portion 213 is formed between two second water inlet windows 211 arranged up and down. A cross-sectional area of the first water inlet window 111 is the same as a cross-sectional area of the second blocking portion 213, and a cross-sectional area of the second water inlet window 211 is the same as a cross-sectional area of the first blocking portion 113. The outer circumferential surface of the valve core portion 21 is provided with one second water outlet window 212 correspondingly, an upper side edge of the second water outlet window 212 is at the same height as an upper side edge of a 1st second water inlet window 211, and the second water outlet window 212 is not provided with a lower side edge, that is, the second water outlet window is provided with an opening. When the second water inlet window 211 overlaps with the first water inlet window 111, and the first water outlet window 112 overlaps with the second water outlet window 212, the valve is opened, and when the first water inlet window 111 overlaps with the second blocking portion 213, the valve is closed.

A first reinforcing rib 114 is disposed in the first water inlet window 111 along the vertical direction, and the first reinforcing rib 114 is located on a middle portion of the first water inlet window 111 and divides the first water inlet window 111 into two parts. A second reinforcing rib 214 is disposed in the second water inlet window 211 along the vertical direction, and the second reinforcing rib 214 is located on a middle portion of the second water inlet window 211 and divides the second water inlet window 211 into two parts. An outer circumferential surface of the second reinforcing rib 214 is attached with an inner wall of the first reinforcing rib 114.

An outer circumferential surface of the first blocking portion 113 includes a first water inlet surface 1131 inclining toward a lower end of the valve body 1, a second water inlet surface 1132 inclining toward an upper end of the valve body 1, and a connecting surface 1133 connecting the first water inlet surface 1131 and the second water inlet surface 1132, and the connecting surface 1133 is the outer circumferential surface of the valve body 1.

The swing arm base 4 is of a U shape and includes a bottom plate 41 and two placing blocks 42 disposed on the bottom plate 41. The bottom plate 41 is connected to the connecting portion 12 of the valve body 1 through a fastener, and the bottom plate 41 is provided with a rack through hole 411 allowing the rack portion 22 to penetrate through. The placing blocks 42 are located on two sides of the rack through hole 411, the gear shaft 32 is placed on the two placing blocks 42, the swing arm main body 31 is located on an outer side of one of the placing blocks 42, and a limiting block 421 limiting a swinging angle of the swing arm main body 31 is disposed on an outer circumferential surface of the placing block 42. The swing arm cover 5 includes a cover body 51 and two splicing blocks 52 disposed on the cover body 51. The cover body 51 is detachably connected to the placing blocks 42 through a fastener, the splicing blocks 52 are located at intervals of the two placing blocks 42 and are spliced with the placing blocks 42, and a confined space allowing the gear shaft and the rack portion to move is formed between the swing arm cover 5 and the swing arm base 4. The placing blocks 42 are provided with first circular arc grooves 422 allowing the gear shaft 32 to be placed, the cover body 51 is provided with second circular arc grooves 511 corresponding to the first circular arc grooves 422, and the first circular arc grooves 422 are matched with the second circular arc grooves 511 to clamp the gear shaft 32.

Figure 10:
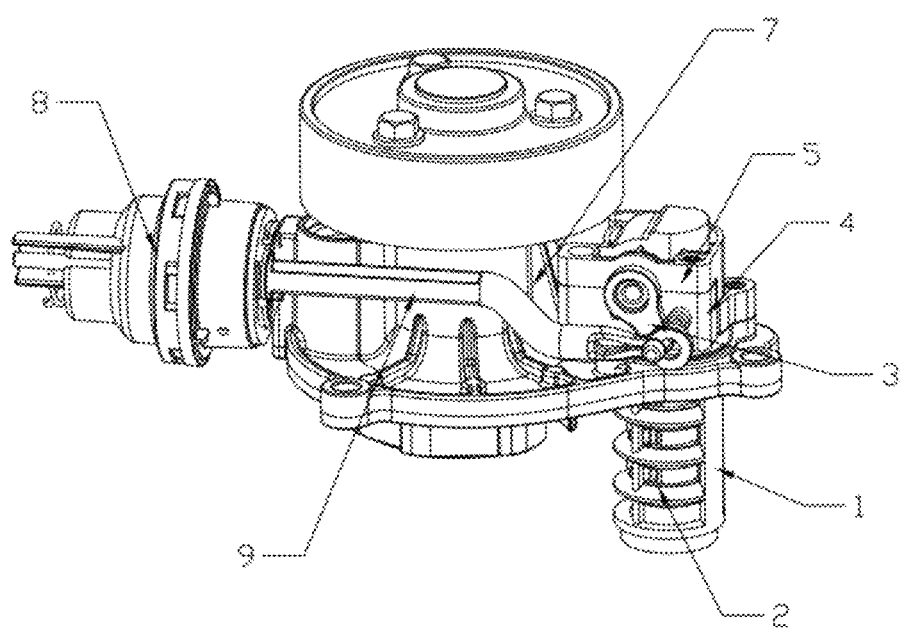
FIG. 10 is a schematic structural diagram of mounting on a vehicle water pump according to an embodiment of the present invention.
Figure 11:
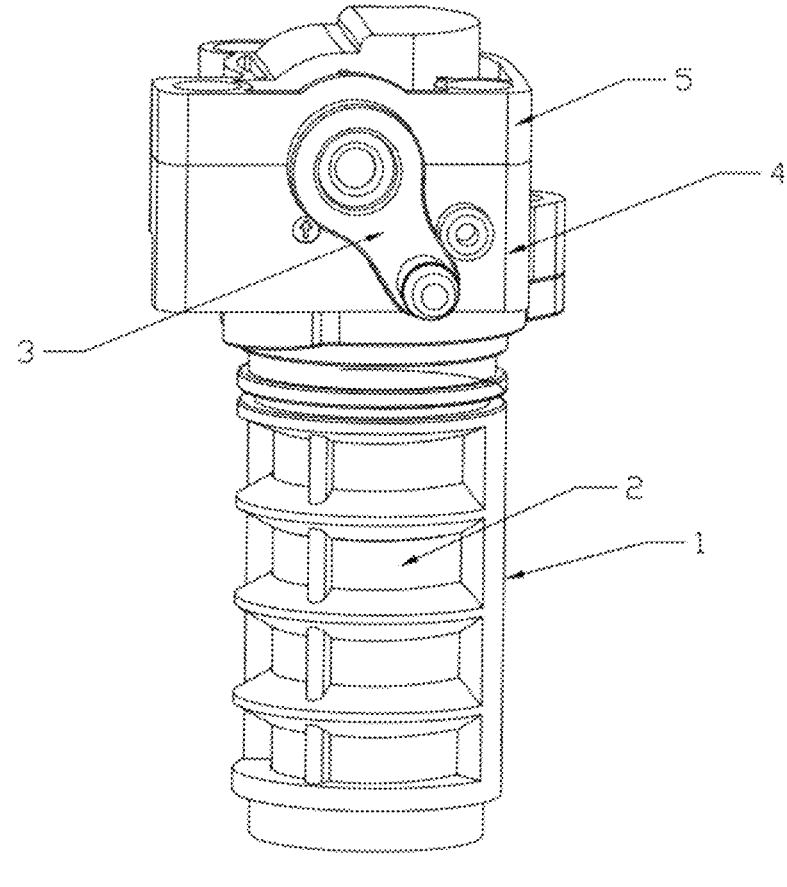
FIG. 11 is a schematic structural diagram of a valve in a closed state according to an embodiment of the present invention.

As shown in FIG. 10, an overall vehicle water pump includes a water pump housing 7. The water pump housing 7 is provided with a valve body through hole allowing the valve body 1 to penetrate through, two connecting lugs 13 are disposed on the connecting portion 12, the connecting lugs 13 are connected to the water pump housing 7 through a fastener, and the swing arm base 4 is provided with connecting holes 43 detachably connected to the connecting lugs 13 through a fastener. A power member 8 is disposed on the water pump housing 7, a connecting rod 9 is disposed at an output end of the power member, and a tail end of the connecting rod 9 is connected to the swing arm main body 31 of the swing arm 3. The power member 8 drives the connecting rod 9 to move, so that the connecting rod 9 drives the swing arm 3 to swing, and the swing arm 3 swings to enable the gear shaft 32 to rotate around a shaft, and the rack portion 22 engaged with the gear shaft 32 moves upward or downward along the vertical direction. The limiting block 421 disposed on the placing block 42 is located on one side that is away from the swing arm 3 and the connecting rod 9 for limiting a swinging amplitude of the swing arm 3. When the swing arm 3 swings to enable the valve core portion 21 to move upward along an axis until the second blocking portion 213 overlaps with the first blocking portion 113, the first water inlet window 111 overlaps with the second water inlet window 211, and the valve is opened at this time. When the swing arm 3 swings to enable the valve core portion 21 to move downward along the axis until the second blocking portion 213 overlaps with the first water inlet window 111, the first blocking portion 113 overlaps with the second water inlet window 211, and the valve is closed at this time. A coolant flow may be adjusted by adjusting an opening size of the valve, that is, when all first water inlet windows 111 overlap with all second water inlet windows 211, the valve is opened completely, and the coolant flow is maximum at this time. The first water inlet window 111 overlaps with the second blocking portion 213 one by one, so that the valve is closed gradually, and the coolant flow is reduced gradually. During actual use, the coolant flow may be adjusted according to an actual vehicle condition.

When an engine is just started, to rapidly increase a temperature of the engine to ensure a normal operation, the valve needs to be closed. After the temperature of the engine is increased, the valve is opened, to perform heat dissipation and heat decreasing on the engine. In actual life, if the temperature of the engine is too low, the valve needs to be closed, and if the temperature of the engine is too high, the valve needs to be opened.

What is claimed is:

1. A control valve applicable to a vehicle water pump, comprising a valve body and a valve core movably disposed in the valve body, wherein the valve body comprises a valve body portion that is of a cylindrical shape and a connecting portion disposed on an end portion of the valve body portion, the valve core comprises a valve core portion sleeved with the valve body and a rack portion penetrating through the connecting portion, an outer circumferential surface of the valve body is provided with at least one first water inlet window and at least one first water outlet window, an outer circumferential surface of the valve core is provided with at least one second water inlet window adapted to the first water inlet window and at least one second water outlet window adapted to the first water outlet window, when the second water inlet window overlaps with the first water inlet window, and the first water outlet window overlaps with the second water outlet window, the valve is opened, when the first water inlet window overlaps with the outer circumferential surface of the valve core, the valve is closed, a swing arm driving the valve core to perform reciprocating movement along a vertical direction to control opening and closing of the valve is disposed on the valve body, a gear shaft engaged with the rack portion is disposed on the swing arm, the rack portion is disposed along the vertical direction, and the gear shaft is disposed along a horizontal direction;

wherein a swing arm base is detachably connected to the connecting portion of the valve body, the swing arm base comprises a bottom plate and two placing blocks disposed on the bottom plate, the bottom plate is provided with a rack through hole allowing the rack portion to penetrate through, the two placing blocks are disposed on two sides of the rack through hole, the gear shaft is mounted on the two placing blocks, a gear of the gear shaft is suspended on the rack through hole and is engaged with the rack portion, a swing arm main body is disposed vertically with the gear shaft, the swing arm main body is located on an outer side of a first placing block of the two placing blocks, and a limiting block limiting a swinging angle of the swing arm main body is disposed on an outer circumferential surface of the first placing block.

2. The control valve applicable to a vehicle water pump according to claim 1, wherein the outer circumferential surface of the valve body portion is provided with a plurality of first water inlet windows arranged along the vertical direction sequentially, a first blocking portion is formed between two first water inlet windows arranged vertically, the outer circumferential surface of the valve core portion is provided with a plurality of second water inlet windows arranged along the vertical direction sequentially, a second blocking portion is formed between two second water inlet windows arranged vertically, a cross-sectional area of each of the plurality of the first water inlet windows is the same as a cross-sectional area of the second blocking portion, and a cross-sectional area of each of the plurality of the second water inlet windows is the same as a cross-sectional area of the first blocking portion.

3. The control valve applicable to a vehicle water pump according to claim 2, wherein a first reinforcing rib is disposed in each of the plurality of the first water inlet windows along the vertical direction, each first reinforcing rib is located on a middle portion of a respective first water inlet window and divides the respective first water inlet window into two parts, a second reinforcing rib is disposed in each of the plurality of the second water inlet windows along the vertical direction, each second reinforcing rib is located on a middle portion of a respective second water inlet window and divides the respective second water inlet window into two parts, and an outer circumferential surface of each second reinforcing rib is attached with an inner wall of each second reinforcing rib.

4. The control valve applicable to a vehicle water pump according to claim 3, wherein an outer circumferential surface of the first blocking portion comprises a first water inlet surface inclining toward a lower end of the valve body, a second water inlet surface inclining toward an upper end of the valve body, and a connecting surface connecting the first water inlet surface and the second water inlet surface, and the connecting surface is the outer circumferential surface of the valve body portion.

5. The control valve applicable to a vehicle water pump according to claim 1, wherein a swing arm cover is detachably connected to the swing arm base, the swing arm cover comprises a cover body and two splicing blocks disposed on the cover body, the cover body is detachably connected to the first placing block through a fastener, the two splicing blocks are located at intervals of the two placing blocks and are spliced with the placing blocks, a confined space allowing the gear shaft and the rack portion to move is formed between the swing arm cover and the swing arm base, the first placing block is provided with a first circular arc groove allowing the gear shaft to be placed, the cover body is provided with a second circular arc groove corresponding to the first circular arc groove, and the first circular arc groove is matched with the second circular arc groove to clamp the gear shaft.

\* \* \* \* \*